United States Patent [19]

Larson

[11] Patent Number: 4,505,322

[45] Date of Patent: Mar. 19, 1985

[54] METHOD OF STORING HEAT AND HEAT STORE FOR CARRYING OUT THE METHOD

[76] Inventor: Sven A. Larson, Beckmans väg 54, S-443 00 Lerum, Sweden

[21] Appl. No.: 547,446

[22] Filed: Oct. 31, 1983

Related U.S. Application Data

[63] Continuation of Ser. No. 212,713, Oct. 30, 1980, abandoned.

[30] Foreign Application Priority Data

Mar. 12, 1979 [SE] Sweden .................................. 7902174
Sep. 6, 1979 [SE] Sweden .................................. 7907409

[51] Int. Cl.³ ........................ F28D 21/00; F28D 17/00
[52] U.S. Cl. .......................................... 165/1; 165/45; 165/10; 60/641.2; 166/271; 166/280; 166/308
[58] Field of Search ............................. 165/45, 1, 10; 60/641.2; 166/271, 308, 280

[56] References Cited

U.S. PATENT DOCUMENTS

| | | | |
|---|---|---|---|
| 3,097,694 | 7/1963 | Kerver | 166/280 |
| 3,786,858 | 1/1974 | Potter et al. | 165/45 |
| 3,878,884 | 4/1975 | Raleigh | 166/271 |
| 3,931,851 | 1/1976 | Harris et al. | 165/45 |
| 4,030,549 | 6/1977 | Bouck | 165/280 |
| 4,078,610 | 3/1978 | Arnold | 166/280 |
| 4,200,152 | 4/1980 | Foster et al. | 165/45 |
| 4,223,729 | 9/1980 | Foster | 165/45 |

FOREIGN PATENT DOCUMENTS

2524390 12/1976 Fed. Rep. of Germany ..... 60/641.2

Primary Examiner—Albert W. Davis, Jr.
Attorney, Agent, or Firm—Murray, Whisenhunt and Ferguson

[57] ABSTRACT

A store for storing heat in rock is produced in that the rock is split up hydraulically in approximately plane parallel fissure planes from a number of boreholes (9, 9', 9", 26). One or more production holes (12, 12', 12", 24, 29) are drilled down to the bottom of the cracked store. Hot water is supplied to the system in that the water is conveyed down to the upper portion of the store, from where the water is conveyed down through the store along zig-zag paths defined by the fissure planes (10, 10', 10", 10a–e) and transverse channels (11, 11', 11", 26,27). Alternatively, the hot water can be supplied along the whole height of the store and travel sideways along the horizontal fissure planes (10''') to the production hole.

11 Claims, 5 Drawing Figures

METHOD OF STORING HEAT AND HEAT STORE FOR CARRYING OUT THE METHOD

This application is a continuation of Ser. No. 212,713, filed Oct. 30, 1980, now abandoned.

TECHNICAL FIELD

The invention relates to a method of storing heat in rock. More specifically, the invention relates to a method of storing heat from periods with an excess of energy to periods with a deficit. The system can work both for short-term storage and over long cycles. In the normal case, the heat store is charged in summer time and emptied in winter time of accumulated heat. The invention likewise relates to the store for carrying out the method.

PRIOR ART

The need for heat storage has become an every more imminent problem, primarily called for by the development of so-called alternative energy sources, particularly sun and wind energy but also excess and waste heat from industry. Against this background, a number of systems have been proposed for accumulating heat in rock. SE 399 761 describes an installation for heat storage in a volume between an upper and a lower blasting out in the bedrock by introducing hot water via the upper blasting out. Between the two places which are blasted out, the volume of the bedrock is perforated by a large number of vertical boreholes, possibly in combination with the fact that the volume is also blasted apart. Furthermore, shafts are taken to the upper and lower places which are blasted out. In other words, this proposed system presupposes very comprehensive installation work and consequently is intended only for very largescale installations where the high installtion costs can be justified. One feature of the system is that the vertical flow directions are given priority over the more horizontal, inter alia through the vertical boreholes between the upper and lower places which are blasted out. A supplementary splitting of the rock between the boreholes by blasting can, through its irregular cracking pattern, lead to an increased risk of uncontrollable passage formation. As a result, it is possible to have a store in which the flow of the water follows a few mainly vertical passages. When the system is charged by introducing hot water, there is therefore a risk that only the parts of the store which lie close to its passages will be heated up to a high degree, while large parts of the store may remain mainly unused because the hot water does not flow through them at all or only to a small extent. The same applies to the discharging of the store. In other words, the effective volume of the store can be reduced very considerably by the passage formation which reduces the effective contact area between the heat carrier and the rock. Admittedly, in itself, it is possible to increase the contact area and hence the effective volume by placing the vertical boreholes very close together, while at the same time the flow through is regulated by adapting the pressure in the rising shaft. Perforating the rock with a very large number of closely distributed boreholes is very expensive, however, and regulation of the pressure in the rising shaft may involve difficult problems from the regulating point of view.

Small-scale systems for long-term storage of heat in rock have also been proposed. One such system, the so-called "sunrock project" is based on storing solar heat in rock. The idea is to drill a plurality of holes situated close together down to a level of about 25 meters below the surface of the ground in the rock. These holes should be lined with pipes or the like. The cost of preparing all these holes is so high, however, that it is difficult to accept, at least not for a small-scale system. Therefore, the "saving system" has also been proposed. Such a system, which is reported in Dagens Industri No. 36, 1979, aims at solving the problem in that the weak point in all existing solar heat systems is the expensive arrangements for the heat storage from summer to winter. In order to reduce the total installation costs in a combined heat-storage and ground reinforcing system, tubular steel piles are used as heat exchangers with the surrounding ground. A prerequisite for being able to use this system, however, is that it is used in combination with a building which needs piles, which, in the favourable case, means that the heat storage effect can be built in without substantial extra cost.

STATEMENT OF INVENTION

The object of the invention is to provide a method of heat storage in rock without the restrictions which characterise existing systems. More specifically, it is an object to bring about a large contact area between the heat carrier—heated/cooled water or another fluid—and the thermal accumulator—the rock. According to the invention a characteristic of many geological formations, particularly isotropic formations, such as granties, magnetites, meta grey rocks etc. is utilized, namely that at least the main stress directions, with the exception of very local deviations, are orientated in a specific direction. Normally, this direction coincides mainly with the vertical direction in the superficial parts of the rock. On splitting, therefore, the rock cracks mainly in a plane parallel plane, something which has been known from time immemorial, interalia from many quarries in southern Sweden. Normally, the parallel fissure planes lie predominantly in horizontal directions, the expression "predominantly or approximately in horizontal directions" being understood to mean that the mean direction over a large area is mainly horizontal but moderate inclinations can occur. Normally, however, the inclinations do not exceed about 30° and in the majority of cases, sufficiently large areas can be found in which the inclinations of the main cracks do not exceed 20° to the horizontal plane. In considerably deeper layers of rock, the stess pattern on the other hand is normally the opposite with crystalline kinds of rock, that is to say at least the main stress direction at deeper levels is normally predominantly orientated in the horizontal direction, which, on splitting, results in predominantly vertical fissure patterns. In sedimentary types of rock, however, the stress direction depends on the bearing plane of the type of rock. This has long been utilized in drilling for oil and in this field a well developed technique has been worked out for the hydraulic splitting of deep layers of rock. By applying and regulating the pressure in view of the local conditions, the vertical cracks can be caused to propagate over considerable distances. In the invention, this experience and technical achievements can be utilized to provide a store for heat storage in superficial layers of rock. Preferably, the rock should be as dense and homogeneous—"isotropic"—as possible, for example granite. The region in which the store is to be placed should also have little flow of ground water. This can be determined by flow tests at the very beginning before the splitting of the rock with the necessary holes. The position for the installation may consist, for example, of a well defined culmination or depression in the groundwater surface. Furthermore, the installation may be disposed under a building to reduce the effects of the temperature curve varying with the time of year or under a translucent cover for sunlight to shine in for additional heating in the summer time.

According to the invention, the rock is split up at different levels of a number of boreholes by applying hydraulic excess pressure at said levels so that a store is obtained with a number of approximately plane parallel fissures, the directions of propagation of which are determined by the natural stress state of the rock. Through the hydraulic splitting, there is the possibility of placing the approximately plane parallel fissures selectively to a great extent at desired levels and with the desired division. The division is determined by a number of factors such as the heat-conducting capacity of the rock, the temperature of the water, the charging time etc. Preferably, however, the fissure planes are placed with a division amounting to between 1 and 5 m.

The extension of the fissure planes are determined according to the storage capacity aimed at. Geological or other technical conditions, as a rule, do not make any problems as far as the achievement of the desired fissure areas is concerned. According to the demands in different cases the horizontal fissures may have an extension from about 150 m$^2$ and more. Usually the individual fissure planes have an extension between 150 and 4 000 m$^2$. Also the depth below the surface of the ground may be varied as well as the number of fissure planes. The number of fissure planes is chosen such that the store will be as compact as possible, i.e. with a high volume to outer surface area ratio in order to reduce the heat losses to surrounding rock. The depth below the surface of the ground should be at least 10 meters if extra ground insulation is not provided for.

Transverse channels are formed between the fissure planes to permit communication between horizontal fissures at different levels. Furthermore, at least one production hole is drilled down to the bottom of the store, after which hot water can be infiltrated into the store along paths determined by the mainly parallel fissure planes and transverse connecting channels, while at the same time colder water is led off from the store through the production hole. During the discharge phase, the heated store can be drained of hot water in a corresponding manner in the same direction or possibly in the opposite direction.

The transverse channels between the parallel fissure planes may to a certain extent consist of natural cracks or of cracks which spontaneously are formed when the horizontal fissures are established. Explosives, however, also may be used to produce the transverse connecting channels between the parallel fissure planes. Such explosions preferably take place after the plane parallel fissure planes have been established by applying hydraulic excess pressure in the borehole.

An other, or complementary, method of providing the transverse connections between the horizontal fissure planes is by boring. That method has the advantage that the transverse channel formation and hence the flow through the store can be performed in a manner which readily can be controlled. For example, for controlling purposes, it is possible to plug up bore holes above and below two adjacent fissure planes such that these two parallel fissures communicate through the bore holes in question while they do not communicate with more distant horizontal fissures through the same bore holes. In the corresponding manner other adjacent parallel fissures may communicate through other boreholes such that water may flow along zig zag path through the store. The combination of hydraulically split up, essentially parallel and horizontal fissure planes and bored transverse communication channels between the fissure planes thus provide for readily controllable transport paths for the water through the store.

Through geological exploration, the hydraulic pressure can be applied at the levels which are most favourable from the point of view of the stress pattern. Thus the pressure is applied in selected sections of the borehole. For example, the selected section is sealed off above and below by sealing sleeves, after which the hydraulic pressure is applied between the sleeves. Alternatively, the pressure can be applied in a bottom section of a borehole so that the rock is split up starting from this section of the borehole. After that, the hole can be drilled out further after which the new bottom section is exposed to the hydraulic excess pressure and so on. In one of these ways or by other means which are based on controlled hydraulic splitting, the mainly plane parallel fissure planes can be caused to extend over large areas, preferably so that the fissure planes extend mainly over the whole width of the store. The number of boreholes is adapted to the volume of the store required and the stress pattern in the rock. In order to avoid "passage effects" in the store through the drilled splitting holes, these can be sealed after they have fulfilled their purpose, that is to say constituted site for hydraulic splitting means. For example, the boreholes can be plugged up with concrete, special cement, bentonite or the like. As an alternative the borehole can be used as transverse channels between fissure planes, possibly after selective plugging up the boreholes, as has been described above.

In order to increase the permeability of the fissures and possible transverse cracks formed to water and in particular to prevent the fissures and cracks from closing again as a result of the fact that the rock expands when the hot water filters in, it is advisable to inject hard particles into the system under pressure. For example, they can be injected by means of a water carrier through the boreholes before these possibly are plugged again. Or they can be injected together with the hydraulic fluid in connection with the splitting. Spacing particles of quartz are suitable in this connection. To make the introduction of the spacing particles into the fissures and cracks more effective, the particles can be introduced together with a lubricant or other substance with similar properties.

After the rock has thus been split up, or possibly beforehand, one or more production holes is/are drilled down to the bottom of the fissure store. If the store has a moderately large volume only one production hole is drilled which is placed in the centre. With larger stores, a plurality of production holes may be required. The production hole is used as a pump hole during operation of the store.

During the charging of the rock prepared in the above manner, hot water is infiltrated into the cracked store while at the same time colder water is drawn off from the store through the production hole. Through the relatively fine-mesh network of water passages which have been split up in the volume of rock, substantially without vertical "high-speed conducting passages", an effective heat charging of the rock can be brought about with high utilization of the energy content of the heat carrier. The hot water is normally obtained from solar collectors, wind power plant, excess or waste heat from industry or the like. The hot water can be introduced into the store via an infiltration surface above the fissure store if this is situated at a greater depth. The flow through the store can be controlled by pumping in the production hole but the system can also be set under pressure, that is to say so that the hot water is forced into the fissure store.

In the latter case, the installation may be said to be closed. A certain pumping in the production hole may also occur between the charging and discharging phases to keep the heat "in place" if a minor stream of ground water should occur through the store. In this case, the pumping is regulated so that it is adapted to this flow of ground water.

During the discharge of the store during the discharge phase, hot water is drained off by pumping out of the production hole. The water which is drained off is replaced by colder water which is introduced the same way and in the same direction as the hot water during the charging phase. This hot water can be used in a manner known per se, for house heating in a radiator system or for other purposes, possibly via a heat pump. The pump capacity of the production hole or production holes, the temperature of the incoming water, the volume of the store, the thermal capacity of the rock and its heat conducting capacity determine the capacity of the system. With the method according to the invention, the hydrogeological, thermal and mechanical properties and conditions of the rock are utilized.

Besides heat storage, the same store as described above can also be used for "cold storage". In this case, the store is cooled down by means of cold water during a charging phase, after which the store is discharged in a similar manner to the preceding case. This modification of the method according to the invention can be utilized for example to provide cold water for air-conditioning systems in an economically advantageous manner.

Other applications and combination possibilities can also be imagined, for example as a reference temperature store when using the so-called chemical heat pump.

BRIEF DESCRIPTION OF THE DRAWINGS

Some conceivable forms of embodiment of the heat store according to the invention are illustrated diagrammatically in the figures.

In the Figures, only the parts essential for an understanding of the invention have been included while other details of less importance for an understanding of the invention have been omitted so that what is essential may be clearer.

DESCRIPTION OF PREFERRED FORMS OF EMBODIMENT

Figure 1:
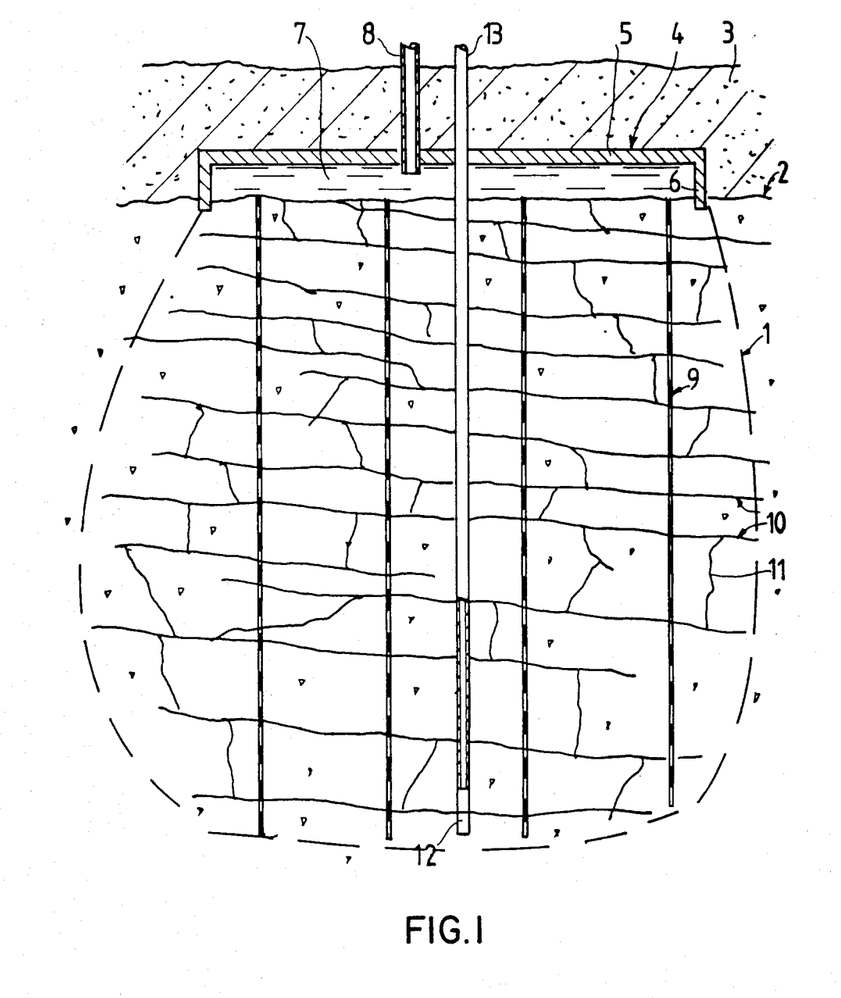
FIG. 1 shows a vertical section through a heat store disposed following on the surface of the rock.

Referring first to FIG. 1, a heat store in a body of rock is designated in general by the numeral 1. The upper surface of the body of rock is designated by 2. A layer of sand, moraine or the like is designated by 3. Disposed above the heat store 1 is an infiltration installation 4, which substantially covers the store 1 and consists of a cover 5 with a wall 6 extending all round which is tightly connected to the surface of the rock 2. The cover 5 and the wall 6 may consist of concrete, for example, which is cast on the rock 2, after which the layer 3 covers the cover 5 so that important hydraulic pressure can be applied in the interior 7 of the infiltration installation 4. A supply pipe for water to the interior of the infiltration installation is designated by 8. The pipe 8 and hence the interior 7 of the installation 4 can be put under excess pressure.

For the splitting of the store 1, a number of vertical boreholes 9 are made. By hydraulic excess pressure in the boreholes 9, the rock has been split up in well defined sections of the boreholes. Since a favourable location was selected for the installation, the rock, which has the minimum main stress direction orientated in the vertical direction, has split mainly in the horizontal direction. The mainly horizontal cracks are designated by 10. Between the horizontal cracks there extend cracks 11 orientated more or less vertically so that a network is obtained with a very large fissure surface. The permeability of the cracks 10 and 11 has also been increased by injecting sand under pressure via the boreholes 9. Then the boreholes 9 were sealed—plugged—with concrete, special cement or bentonite to avoid "passage effects" in the heat store 1. In the centre of the heat store 1, a production hole 12—pump hole—has been drilled down to the bottom of the store. A connection pipe to the production hole 12 is designated by 13.

The heating of the store 1 is effected by supplying hot water—possibly under pressure—to the infiltration surface above the heat store, that is to say to the interior 7 of the infiltration installation 4. The hot water advances downwards in the store 1 and follows a large number of zig zag paths defined by the mainly horizontal cracks 10 and the more vertical connecting cracks 11. The flow through the store can be controlled by regulated pumping in the bottom of the production hole 12 or possibly at different levels in the production hole. During the discharge, the hot water is drawn off from the borehole 12 while at the same time colder water fills the store 1.

Figure 2:
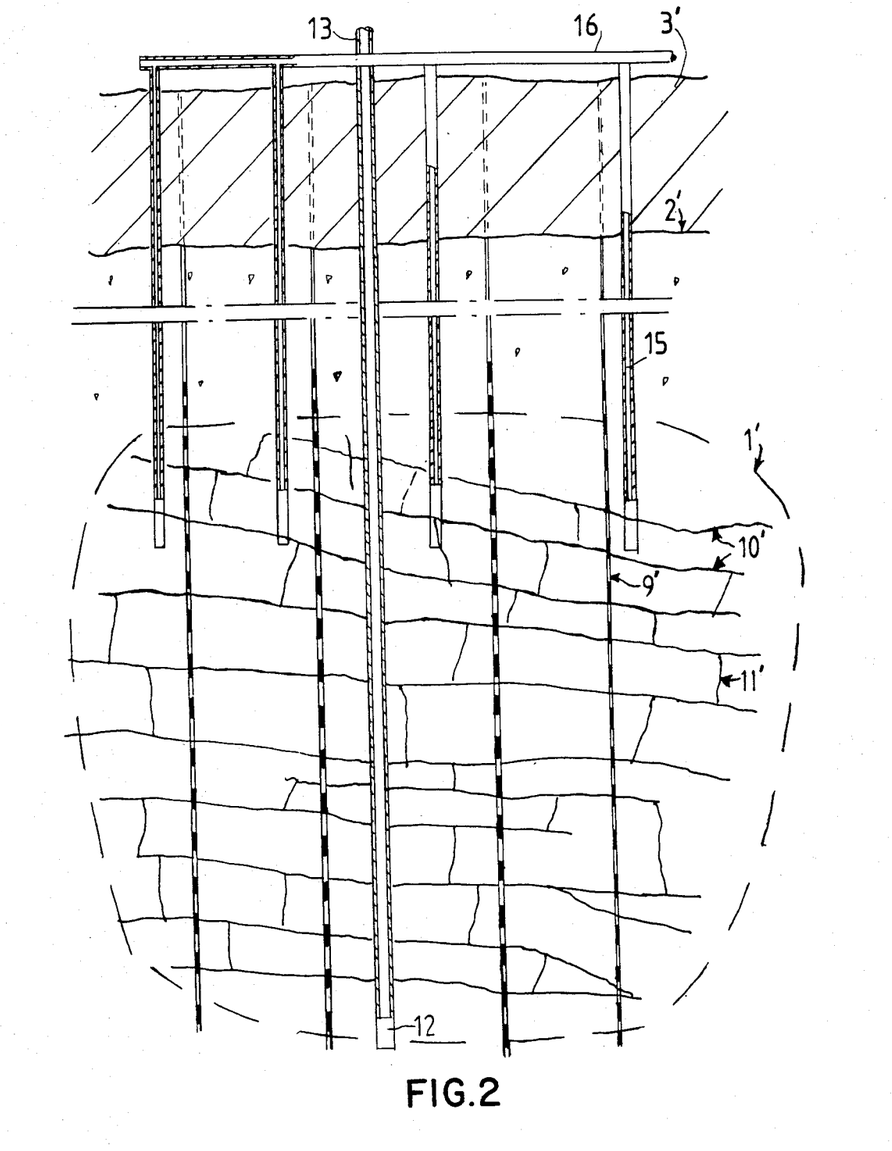
FIG. 2 shows in a corresponding diagrammatic manner, a section through a heat store disposed at a greater depth in a body of rock.

FIG. 2 shows a heat store at a greater depth in the rock. For parts which correspond to FIG. 1, the same reference numerals have been used with the addition '. For these parts, therefore, reference should be made to the description of the preceding form of embodiment. The installation of FIG. 2 differs from the preceding one only in that it is situated at a greater depth and that the connections to the store must be modified and supplemented accordingly. Thus the water is led to the store—not via an infiltration surface—but via a number of vertical infiltration pipes 15 which lead into the upper part of the store 1'. The pipes 15 are connected to a feed pipe 16 which can be placed under pressure.

Figure 3:
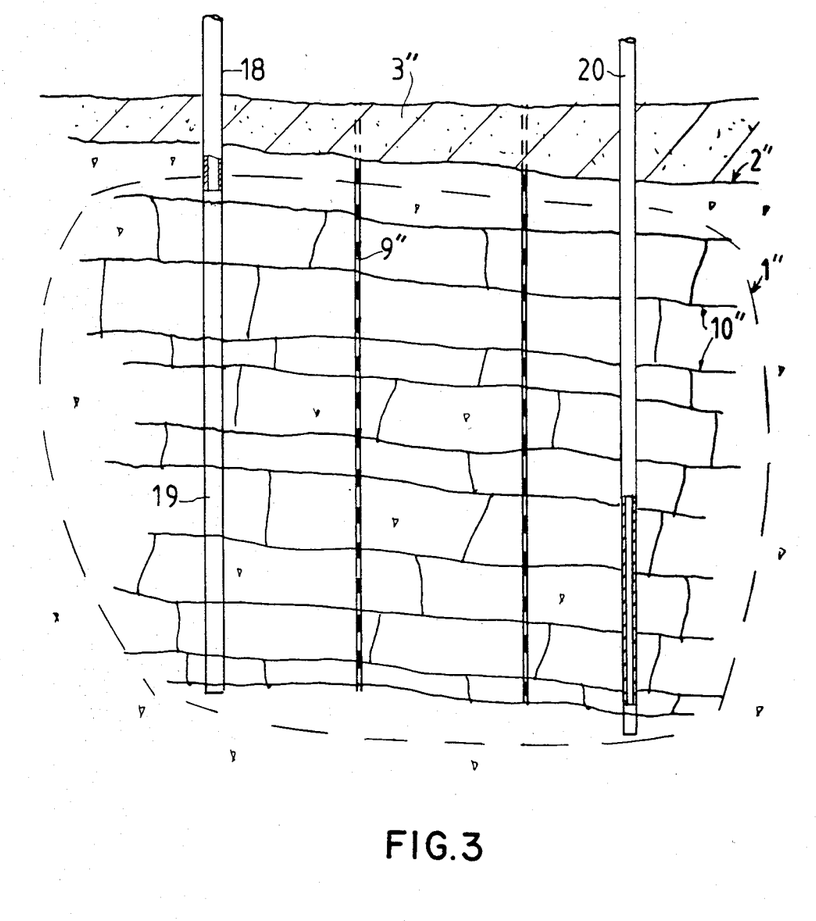
FIG. 3 shows a vertical section through a heat store adapted to work in an alternative manner according to the invention.

FIG. 3 shows a heat storage system adapted to work in a different manner from the systems according to FIGS. 1 and 2. For parts which correspond to FIGS. 1 and 2, the same reference numerals have been used in FIG. 3 with the addition ". According to the form of embodiment, a vertical infiltration pipe is designated by 18. As distinct from what was the case with the infiltration pipes according to the previous forms of embodiment, the borehole 19, to which the pipe 18 is connected extends down to the bottom of the fissure store 1". The number of boreholes 19 and infiltration pipes 18 may vary. For example, a number of infiltration boreholes 19 with associated pipes 18 may be disposed in a row and a number, for example an equally great number, of production holes 12" may be disposed parallel to the boreholes 19. It is also possible to arrange a production hole in the centre and infiltration holes concentrically round the production hole. Lowered into the production hole 12" is a pump pipe 20 which extends substantially down to the bottom of the production hole 12". The pump pipe 20 may be provided with perforations at suitable levels so as to be able to receive and pump up water directly from these levels.

Whereas the water in the system according to FIGS. 1 and 2 was intended to be introduced into the upper parts of the fissure system and then be transported down in a zig-zag pattern through the fissure store, the hot water according to the form of embodiment in FIG. 3 is intended to be introduced into the borehole 19 and from this to travel substantially horizontally along the fissure planes 10" to the production hole 12". From the production hole 12", the water is pumped up through the pump pipe 20 until the store has heated up.

Figure 4:
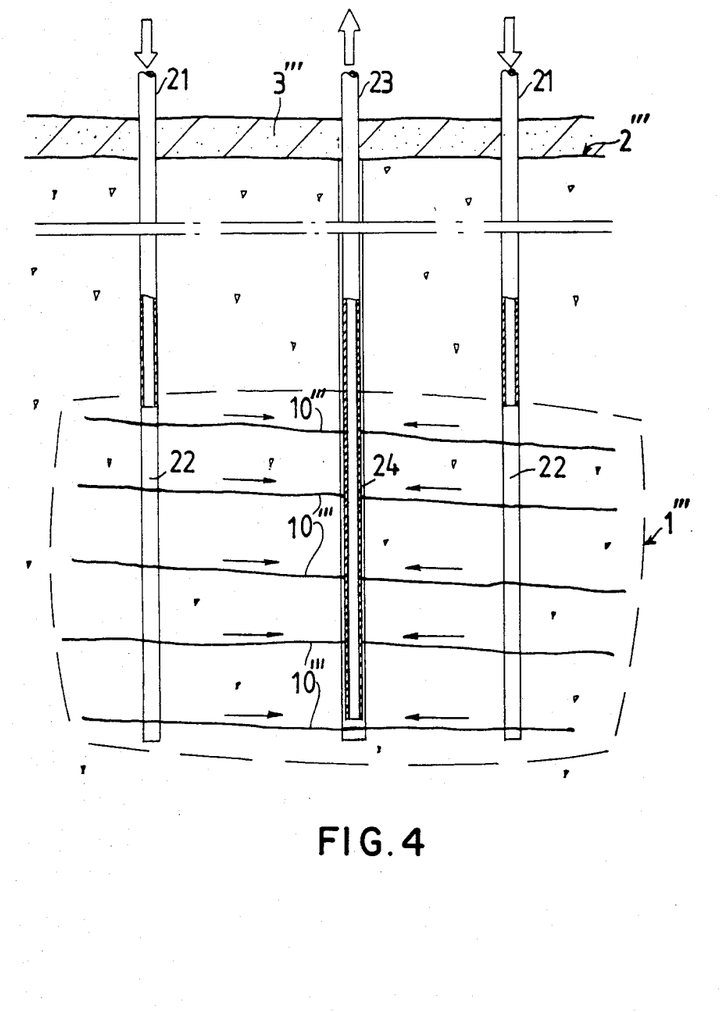
FIG. 4 shows a vertical section through a heat store adapted to work in still another modified embodiment of the invention.

In the embodiment according to FIG. 4, where parts which correspond to preceding figures have been provided with the addition "', the horizontal directions of movement of the water have been further dominating. The vertical connection channels between the horizontal fissure planes 10''' according to this embodiment have been reduced to the infiltration holes 22 and the production hole 24. Naturally, to a certain extent also naturally occurring cracks may exist as well as cracks which spontaneously form when the rock is split up through the horizontal fissure planes 10'''. In the infiltration holes 22 connection pipes 21 have been inserted to the upper part of the store 1''', and in the production hole 24 there is provided a pumping pipe 23. In the heat store according to FIG. 4 the hot water is led in through the conduits 21 into the infiltration holes 22. From the infiltration holes 22 the water follows the parallel fissure planes 10''' to the production hole 24, wherefrom the colder water easily may be pumped up through conduit 23 during the charging season. During the discharge phase the hot water correspondingly is pumped up from the production hole 23, at the same time as colder water may infiltrate through conduits 23 and infiltration holes 22.

Figure 5:
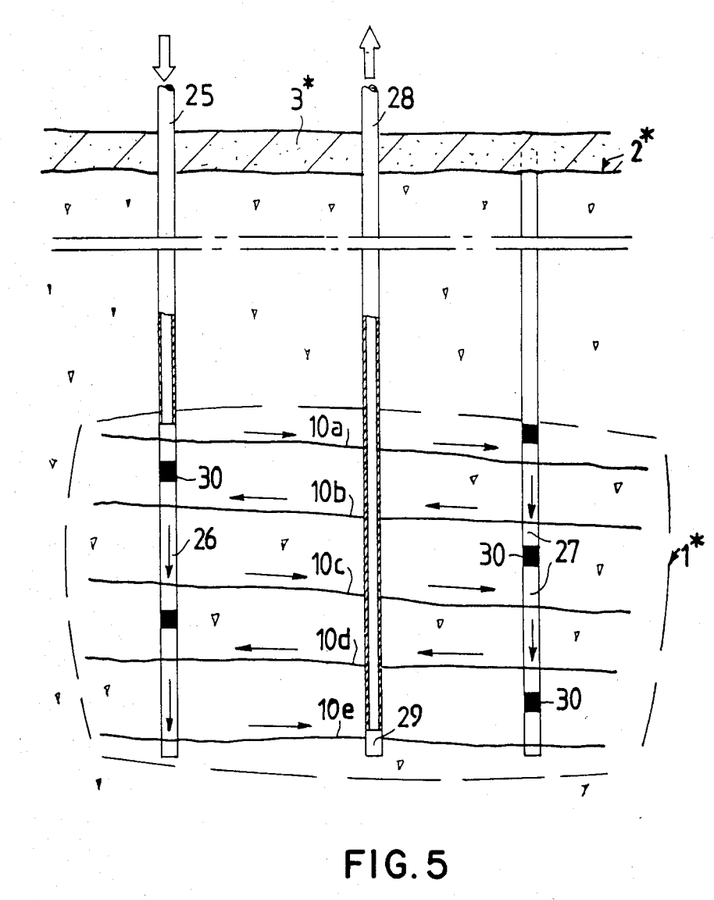
FIG. 5 illustrates, through a vertical section, one further alternative embodiment of the heat store of the invention.

Nor according to the embodiment illustrated in FIG. 5 any particular, transverse cracks have been provided between the essentially parallel and essentially horizontal fissures which in this case have been shown as 10a–e. The vertical transport routes are provided for by the infiltration hole 26 and when necessary (when there is only a single infiltration hole 26) an auxiliary hole 27. The production hole in this case has been designated 29 and a pump conduit is shown as 28. An infiltration conduit 25 is inserted in the infiltration hole 26 down to the upper part of the store 1*. The upper surface of the rock has been shown as 2* and the ground layer thereover as 3*.

Further, in the infiltration hole 26 and in the auxiliary hole 27 (instead of an auxiliary hole 27 there may be provided another infiltration hole or a plurality of infiltration holes) there have been provided plugs 30 so that the water is forced to pass through the store via a very well defined zig-zag path. From the conduit 25 the water thus first follows the fissure plane 10a to the auxiliary hole 27 and is conveyed through said auxiliary hole to the fissure plane 10b. Gradually the water again will reach the infiltration hole 26 which will convey the water to next fissure plane 10c, and from the fissure plane 10c the water is fed again by means of the auxiliary hole 27 to the fourth fissure plane 10. Eventually the water via the infiltration hole 26 will reach the bottom fissure 10e which communicates with the bottom of the production hole 29, from where the water can be pumped up through the pump conduct 28.

EXAMPLES

In order to illustrate the qualifications of the heat store the following two examples may be referred to.

A. Heat store for a one-family house; residential floor area: 130 m$^2$, annual heat requirement; appr. 20 MWh, peak effect required: 10 kW.

B. Heat store for a multi-unit dwelling; residential floor area: 1 000 m$^2$, annual heat requirement; appr. 200 MWh; peak effect required: 100 kW. The bedrock is presupposed to consist of "normal" granite with the following thermal characteristics:

Thermal conductivity: 3,5 W/m,° C.
Thermal capacity: 0,563 kWh/m$^3$

The coefficient for heat transfer from the surface of the ground to the environment is supposed to be in the order of 10 W/m$^2$, ° C.

In order to be able to store the entire annual heat requirement there will in case A be needed an effective rock volume of approximately 2,400 m$^3$ and in case B appr. 24,000 m$^3$. In the case of storage temperatures above the average temperature of the rock also large volumes of rock surrounding the effective volume must be treated in order that the heat losses in the effective volume will be kept within toleratable limits. In the examples the upper surface of the heat store is supposed to lie about 20 m below the surface of the ground.

The required fissure areas (fissure plane areas) under the above given conditions will be in case A appr. 700 m$^2$ and in case B appr. 7,000 m$^2$. For storing the entire annual heat requirement only two fissure planes will be needed in case A and five fissure planes in case B. Necessary water flows for charging/discharging will be about 90 l/min and about 900 l/min in cases A and B, respectively.

I claim

1. A method of storing heat in rock comprising forming heat exchanging surfaces in substantially underground rock by forming a plurality of bore holes in said rock, forming heat exchanging surfaces in said rock by forming a plurality of stratum-like rock sections between approximately plane parallel cracks in directions determined by the natural stress state of the rock by applying hydraulic excess pressure at different levels to split up the rock at the different levels, providing transverse channels between said cracks whereby said cracks are connected by a number of transverse channels, and providing at least one production hole in the cracked heat storing rock volume provided, heat the stratum-like rock sections between the cracks by infiltrating hot water into the fissured rock to cause the hot water to follow a plurality of the approximately plane parallel cracks, while drawing off colder water through said production hole, to contact the heat exchanging surfaces in the region of the cracks to heat the rock by exchange of heat from the water to produce a heat reservoir of heated rock, and recovering heat by infiltrating cold water into the heat reservoir of heated rock to heat the water, and withdrawing heated water from the rock.

2. Method of claim 1, wherein said rock has its minimum stress direction orientated in the vertical direction.

3. Method as claimed in claim 1, including the additional step of blasting transverse channels between the parallel fissure planes after the plane parallel fissure planes have been established by applying said hydraulic excess pressure.

4. Method as claimed in claim 1, wherein a plurality of bore holes are sealed selectively to establish transverse channels through said bore holes between adjacent fissure planes while selectively sealing against other fissure planes so as to avoid passage formations straight through said rock.

5. Method as claimed in claim 1, wherein the permeability of said cracks to water is made permanent by the additional step of injecting hard particles into the cracks under presure so that the particles act as spacing elements to prevent the cracks from closing again as a result of rock expansion during hot water infiltration.

6. Method according to claim 1, wherein the hot water is conveyed from the upper portion of the cracked heat storing rock volume along zig-zag paths defined by the approximately plane parallel cracks and the transverse channels to the bottom of said cracked rock.

7. Method as claimed in claim 1, including the additional steps of providing at least one infiltration hole for conveying water in an approximately horizontal direction to at least one production hole along the approximately plane parallel cracks, said plane parallel cracks being connected in parallel.

8. Method as claimed in claim 1, wherein the stratum-like rock sections are heated by introducing hot water into an infiltration surface above the cracked body of rock, and controlling flow of the hot water through the rock.

9. Method as claimed in claim 1, wherein the stratum-like rock sections are heated by introducing hot water through a plurality of short injection holes directly down to the cracked heat storing rock volume while controlling the flow of the water through the rock volume.

10. A heat store comprising a volume of rock located at least substantially underground and having a plurality of bore holes therein, with a plurality of approximately horizontal cracks originating from said bore holes, said cracks being connected by a plurality of transverse channels to provide a coherent fissure system, a plurality of spacing particles being located in the cracks to prevent the cracks from closing as the result of thermal movements in the rock, and at least one substantially vertical production hole extending down to the bottom of the cracked rock volume.

11. Heat store as claimed in claim 10, wherein the horizontal cracks are connected with one another through channels to form a coherent zig-zag network within the rock.

* * * * *